US012689576B2

(12) United States Patent

Prakash et al.

(10) Patent No.: US 12,689,576 B2

(45) Date of Patent: Jul. 21, 2026

(54) AUTONOMOUS ADAPTIVE ROUTE-SUMMARIZATION

(71) Applicant: CIENA CORPORATION, Hanover, MD (US)

(72) Inventors: Anurag Prakash, Kanata (CA); Praveen Kumar Mada, Kanata (CA); Chaitanya Varma Guntumadugu, Kanata (CA); Jayesh Jayachandra Kumar, Kanata (CA)

(73) Assignee: CIENA CORPORATION, Hanover, MD (US)

( * ) Notice: Subject to any disclaimer, the term of this patent is extended or adjusted under 35 U.S.C. 154(b) by 137 days.

(21) Appl. No.: 18/746,731

(22) Filed: Jun. 18, 2024

(65) Prior Publication Data

US 2025/0385854 A1 Dec. 18, 2025

(51) Int. Cl.
H04L 45/02 (2022.01)
H04L 43/10 (2022.01)

(52) U.S. Cl.
CPC .............. H04L 43/10 (2013.01); H04L 45/02 (2013.01)

(58) Field of Classification Search
CPC ................................ H04L 43/10; H04L 45/02
USPC .......................................................... 709/224
See application file for complete search history.

(56) References Cited

U.S. PATENT DOCUMENTS

| | | | |
|---|---|---|---|
| 11,336,563 B1 * | 5/2022 | Kurmala | H04L 61/5061 |
| 11,750,497 B2 | 9/2023 | Mada et al. | |
| 2008/0130500 A1 * | 6/2008 | Retana | H04L 12/66 |
| | | | 370/235 |
| 2009/0073994 A1 * | 3/2009 | Qureshi | H04L 45/04 |
| | | | 370/401 |

(Continued)

*Primary Examiner* — Ario Etienne
*Assistant Examiner* — Kidest Mendaye
(74) *Attorney, Agent, or Firm* — Guntin & Gust, PLC; Kenneth S. Kwan

(57) ABSTRACT

Aspects of the subject disclosure may include, for example, an apparatus, comprising: a processing system including a processor; and a memory that stores executable instructions that, when executed by the processing system, facilitate performance of operations, the operations comprising: automatically determining for a plurality of downstream network nodes one or more subnet identifiers, one or more network identifiers, or a combination thereof; automatically summarizing the one or more subnet identifiers, the one or more network identifiers, or the combination thereof to produce a summary; automatically determining whether the summary requires updating, resulting in a determination; and responsive to the determination being that the summary requires updating, automatically updating the summary to produce an updated summary, wherein the updated summary: deletes one or more subnets that were in the summary; adds one or more subnets that were not in the summary; deletes one or more networks that were in the summary, adds one or more networks that were not in the summary; deletes one or more non-existent identifiers, other than the one or more subnet identifiers and the one or more network identifiers, that were in the summary; adds one or more non-existent identifiers, (Continued)

Automatically determining for a plurality of downstream network nodes one or more subnet identifiers, one or more network identifiers, or a combination thereof - 3002

Automatically summarizing the one or more subnet identifiers, the one or more network identifiers, or the combination thereof to produce a summary - 3004

Automatically determining whether the summary requires updating, resulting in a determination - 3006

Responsive to the determination being that the summary requires updating, automatically updating the summary to produce an updated summary, wherein the updated summary: deletes one or more subnets that were in the summary; adds one or more subnets that were not in the summary; deletes one or more networks that were in the summary; adds one or more networks that were not in the summary; deletes one or more non-existent identifiers, other than the one or more subnet identifiers and the one or more network identifiers, that were in the summary; adds one or more non-existent identifiers, other than the one or more subnet identifiers and the one or more network identifiers, that were not in the summary; or any combination thereof - 3008

3000 other than the one or more subnet identifiers and the one or more network identifiers, that were not in the summary; or any combination thereof. Other embodiments are disclosed.

20 Claims, 11 Drawing Sheets

(56)  References Cited

U.S. PATENT DOCUMENTS

| | | | | |
|---|---|---|---|---|
| 2010/0124231 A1* | 5/2010 | Kompella | ........... | H04L 61/5061 |
| | | | | 370/401 |
| 2012/0051364 A1* | 3/2012 | Fujita | ...................... | H04L 45/00 |
| | | | | 370/401 |
| 2012/0290716 A1* | 11/2012 | Ogielski | ................. | H04L 45/08 |
| | | | | 709/224 |
| 2015/0109954 A1* | 4/2015 | Wilkinson | .............. | H04L 41/12 |
| | | | | 370/254 |
| 2020/0259746 A1* | 8/2020 | Thubert | ............. | H04L 47/2483 |

* cited by examiner

| Trie Density | Memory Consumption | CPU/Updates |
|---|---|---|
| Sparse | High | Low |
| Random | Moderate | Moderate |
| Dense | Low | High |

| Prefix | IPv4 | Binary |
|--------|--------|--------|
| P1 | 10.1.1.1 | 00001010.00000001.00000001.00000001 |
| P2 | 10.1.1.2 | 00001010.00000001.00000001.00000010 |
| P3 | 10.1.1.3 | 00001010.00000001.00000001.00000011 |
| P4 | 10.1.1.4 | 00001010.00000001.00000001.00000100 |
| P5 | 10.1.1.5 | 00001010.00000001.00000001.00000101 |

Figure 3:
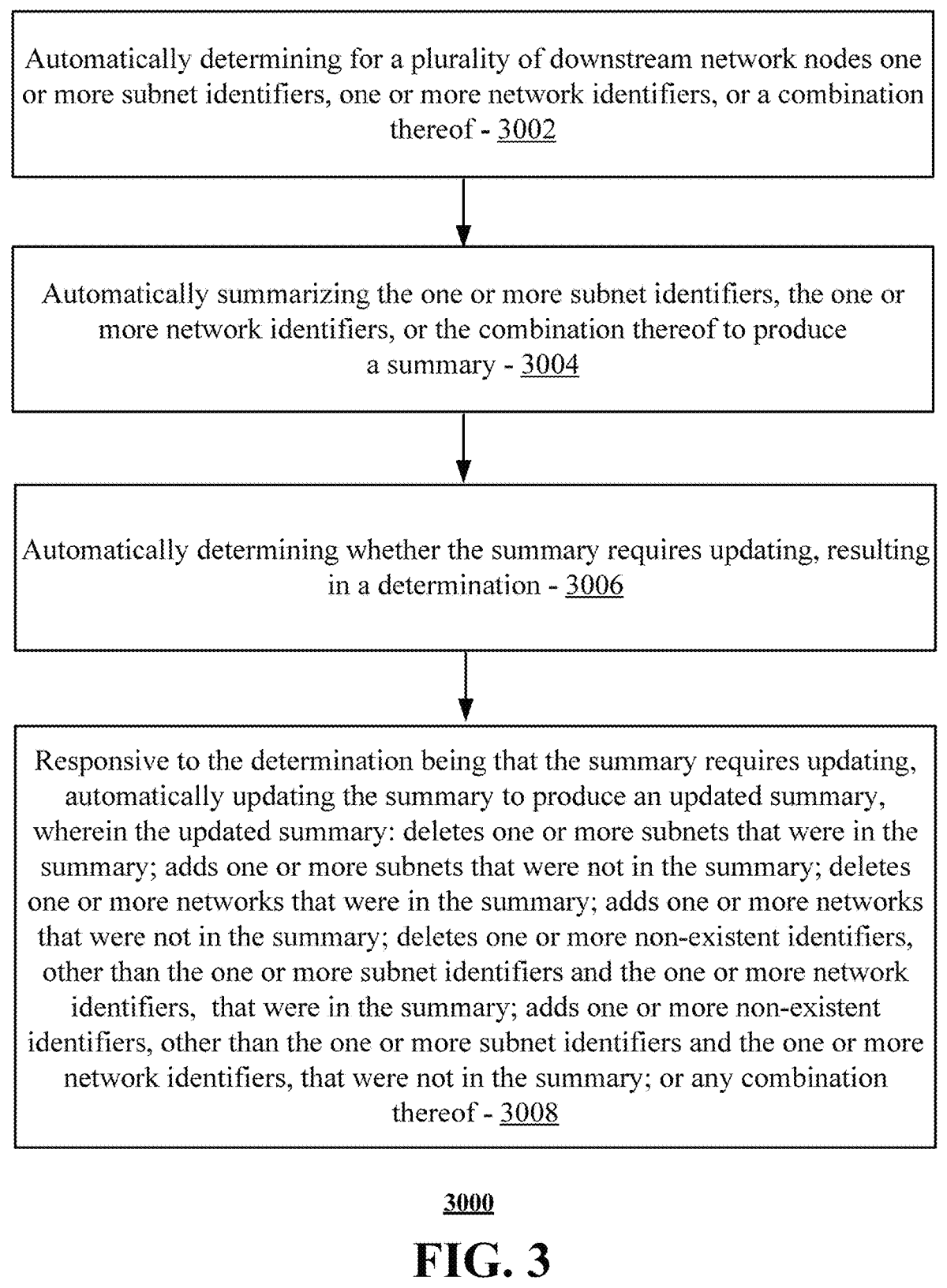

Automatically determining for a plurality of downstream network nodes one or more subnet identifiers, one or more network identifiers, or a combination thereof - 3002

Automatically summarizing the one or more subnet identifiers, the one or more network identifiers, or the combination thereof to produce a summary - 3004

Automatically determining whether the summary requires updating, resulting in a determination - 3006

Responsive to the determination being that the summary requires updating, automatically updating the summary to produce an updated summary, wherein the updated summary: deletes one or more subnets that were in the summary; adds one or more subnets that were not in the summary; deletes one or more networks that were in the summary; adds one or more networks that were not in the summary; deletes one or more non-existent identifiers, other than the one or more subnet identifiers and the one or more network identifiers, that were in the summary; adds one or more non-existent identifiers, other than the one or more subnet identifiers and the one or more network identifiers, that were not in the summary; or any combination thereof - 3008

AUTONOMOUS ADAPTIVE ROUTE-SUMMARIZATION

FIELD OF THE DISCLOSURE

The subject disclosure relates to autonomous adaptive route-summarization.

BACKGROUND

FIG. 1A is a block diagram illustrating certain conventional summarization for IBGP (Internal Border Gateway Protocol) route aggregation. As seen in this figure, a plurality of endpoint devices 1002A-1002D are configured for bi-directional communication with Router A (call-out number 1004) and Router B (call-out number 1006). Further, each of Router 1004 and Router 1006 is configured for bi-directional communication with Router C (call-out number 1008). Moreover, Router 1008 is configured for bi-directional communication with endpoint device 1010. In this configuration, Router 1004 and Router 1006 are aggregating nodes. Under this conventional mechanism, a number of challenges exist, including: (a) Administrative overhead; (b) Traffic blackholing (e.g., no recovery); (c) Causes sub-optimal routing paths towards destination; and/or (d) Wastes bandwidth of the links.

FIG. 1B is a Table 1100 illustrating certain aspects of conventional TRIES Optimization. Compression techniques used in optimizing memory consumption for TRIES include: (a) Level compression (Compress nodes on the same level with the same prefix into a single node); (b) Path compression (Compress chains of nodes with only one child into a single node); and (c) Adaptive compression (Dynamically select the most effective compression technique for each node). As shown in this figure, Tries can be classified into Sparse, Random and Dense Tries based on density of distribution of prefixes. The optimization performance can be evaluated through memory consumption and CPU/updates.

BRIEF DESCRIPTION OF THE DRAWINGS

Reference will now be made to the accompanying drawings, which are not necessarily drawn to scale, and wherein:

FIG. 1B is a Table illustrating certain aspects of conventional TRIES Optimization.

FIG. 2E is a block diagram illustrating an example, non-limiting embodiment of summarized route FIB install with exception NLRIs in accordance with various aspects described herein.

FIG. 3 depicts an illustrative embodiment of a method in accordance with various aspects described herein.

DETAILED DESCRIPTION

Figure 1A:
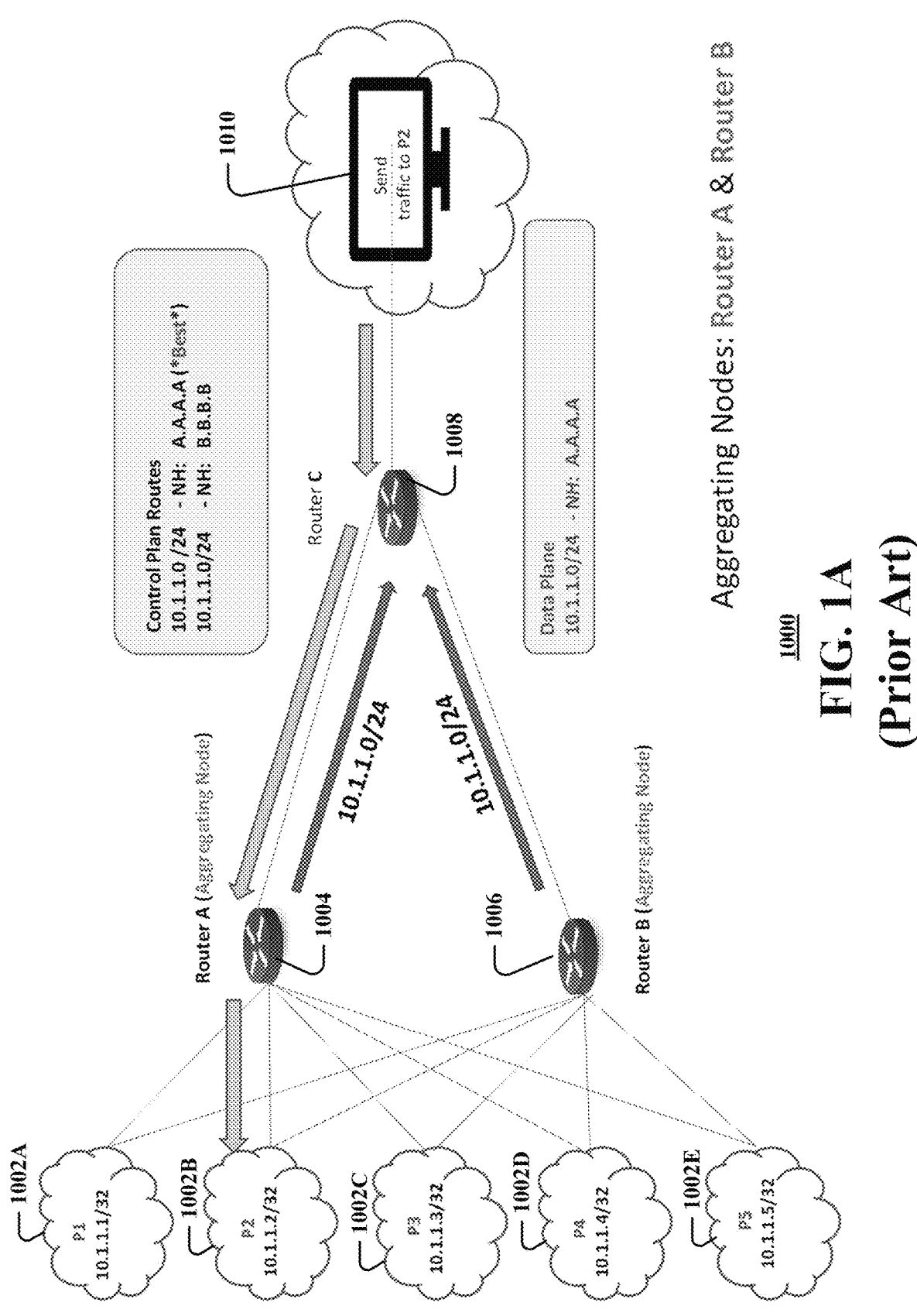
FIG. 1A is a block diagram illustrating certain conventional summarization for IBGP route aggregation.

The subject disclosure describes, among other things, illustrative embodiments for autonomous adaptive route-summarization. Other embodiments are described in the subject disclosure.

One or more aspects of the subject disclosure include an apparatus, comprising: a processing system including a processor; and a memory that stores executable instructions that, when executed by the processing system, facilitate performance of operations, the operations comprising: automatically determining for a plurality of downstream network nodes one or more subnet identifiers, one or more network identifiers, or a combination thereof; automatically summarizing the one or more subnet identifiers, the one or more network identifiers, or the combination thereof to produce a summary; automatically determining whether the summary requires updating, resulting in a determination; and responsive to the determination being that the summary requires updating, automatically updating the summary to produce an updated summary, wherein the updated summary: deletes one or more subnets that were in the summary; adds one or more subnets that were not in the summary; deletes one or more networks that were in the summary, adds one or more networks that were not in the summary; deletes one or more non-existent identifiers, other than the one or more subnet identifiers and the one or more network identifiers, that were in the summary; adds one or more non-existent identifiers, other than the one or more subnet identifiers and the one or more network identifiers, that were not in the summary; or any combination thereof. In various embodiments, each of the automatically determining the node identifiers, the automatically summarizing, the automatically determining whether the summary requires updating, and the automatically updating can be carried out sequentially without human interaction.

As used herein, a network identifier can be a network prefix for a range of addresses where a subnet mask separates the network prefix and the host identifier from an address, e.g. 192.1.2.0/24 is the network prefix for an address space of (256) with an associated subnet mask (255.255.255.0).

As used herein, a subnet identifier can be a subnet within an IP network where some high-order bits from the host identifier are designated as part of the network prefix on the subnet mask, e.g. 192.1.2.0/25 and 192.1.2.128/25 are the sub-network prefixes for two address spaces (128) after subnetting with an associated subnet mask (255.255.255.128).

Reference will now be made to autonomous adaptive route-summarization according to various embodiments. Such embodiments can be applied, for example, in Layer 3 routers, where the network prefixes are stored to forward traffic and advertise the routes to the rest of the network via any desired routing protocols. Such embodiments can facilitate a mechanism via which a given router (or other system) can dynamically identify the scope of such route summarization, as well as advertise and withdraw as required. Such embodiments can represent the IP Prefixes in Radix-trie (or Patricia trie). In various examples, based on how the prefixes are stored and arranged, at each level (e.g., each bit represents each level) the router (or other system) can identify if there is scope for summarization for the given level/bit-if "yes", then the router (or other system) would summarize and advertise the summarized prefix in place of the individual routes. For example, there is a network including four routes—Route-1:10.10.10.0/32    Route-2:10.10.10.1/32, Route-3:10.10.10.2/32 Route-2:10.10.10.3/32. The router (or other system) can summarize these four network/prefixes into the summarized prefix 10.10.10.0/30 (Route-Summary of level 2). In another example, if n levels of routes are summarized, $2^n$ routes can be replaced with one route in the best-case scenario (exact summarization depends on the networks/IP Prefixes distribution across the network). In various examples, the autonomous adaptive route-summarization can be applied to IPv4 and/or IPv6 with or without LU (Labeled Unicast). In other examples, the autonomous adaptive route-summarization can be applied to the BGP Routing protocol (and/or to any other applicable summarization techniques/protocols).

Reference will now be made to certain details of an adaptive summarization algorithm according to various embodiments. More particularly, an adaptive summarization algorithm according to these embodiments can work on three main concepts. Firstly, the algorithm can look for summarization based on thresholds, to collapse the RIB sub-tries, based on sparsity. Secondly, the algorithm can update ADJ-RIB-OUT (Adjacency RIB Outgoing) towards a specific BGP peer, to reduce the number of advertised prefixes (this ADJ-RIB-OUT could be different from RIB-LOCAL which is installed in the FIB, which sometimes happens conventionally due to outgoing filters). The reduction in number of advertised prefixes can lead to increased efficiency relative, for example, to certain conventional mechanisms. Thirdly, the algorithm can use negative prefixes for advertisements and RIB sub-trie updates.

Figure 2A:
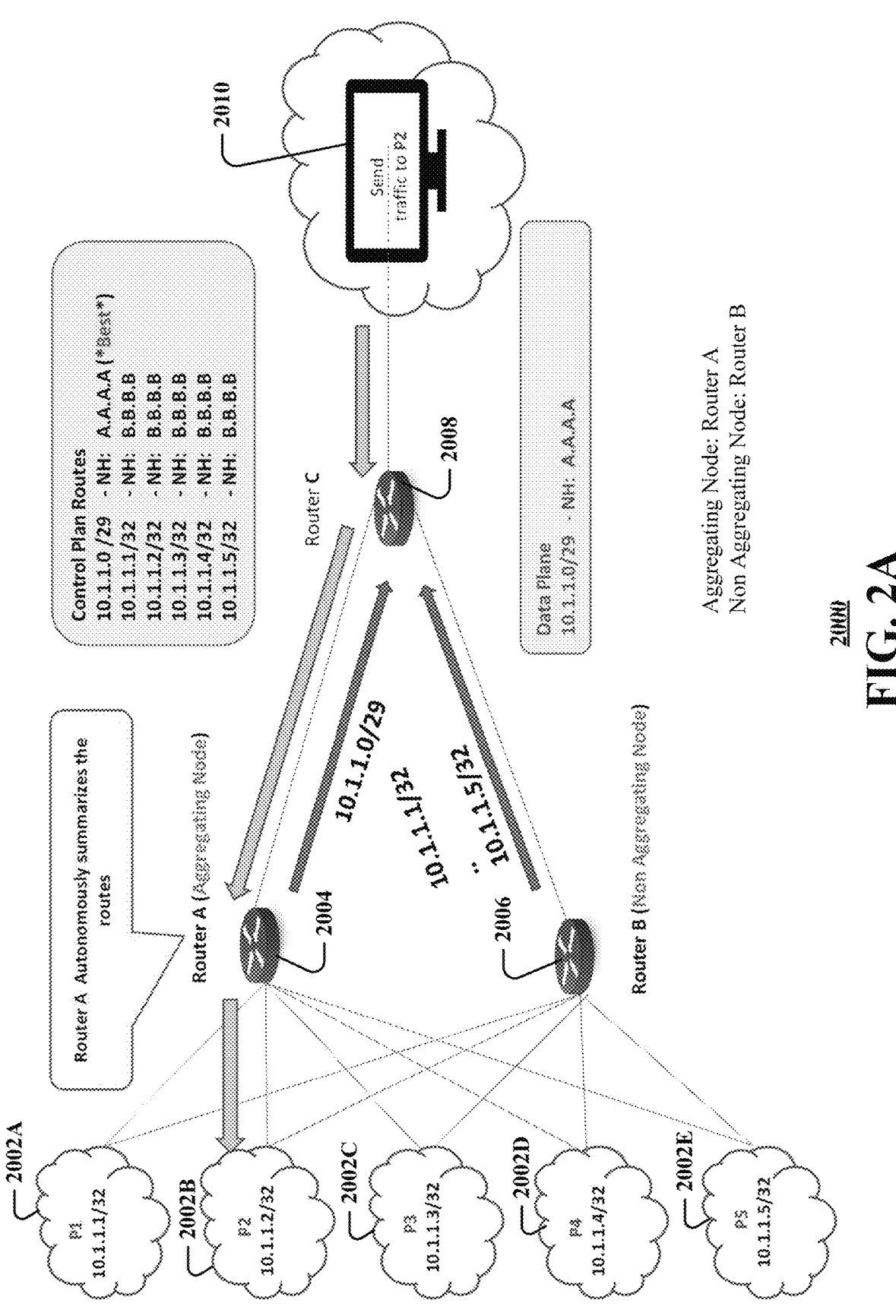
FIG. 2A is a block diagram illustrating an example, non-limiting embodiment of IBGP autonomous route aggregation in accordance with various aspects described herein.

Referring now to FIG. 2A, this is a block diagram illustrating an example, non-limiting embodiment of IBGP autonomous route aggregation in accordance with various aspects described herein. As seen in this figure, a plurality of endpoint devices 2002A-2002E are configured for bi-directional communication with Router A (call-out number 2004) and Router B (call-out number 2006). Further, each of Router 2004 and Router 2006 is configured for bi-directional communication with Router C (call-out number 2008). Moreover, Router 2008 is configured for bi-directional communication with endpoint device 2010. In this configuration, Router 2004 is an Aggregating Node and Router 2006 is a Non Aggregating Node. Further, in this example, Router 2004 is configured (e.g., via use of hardware, firmware, and/or software) to autonomously and dynamically summarize routes as described herein (of course, any other number of routers (and/or other devices) in the network can be similarly configured).

Figure 2B:
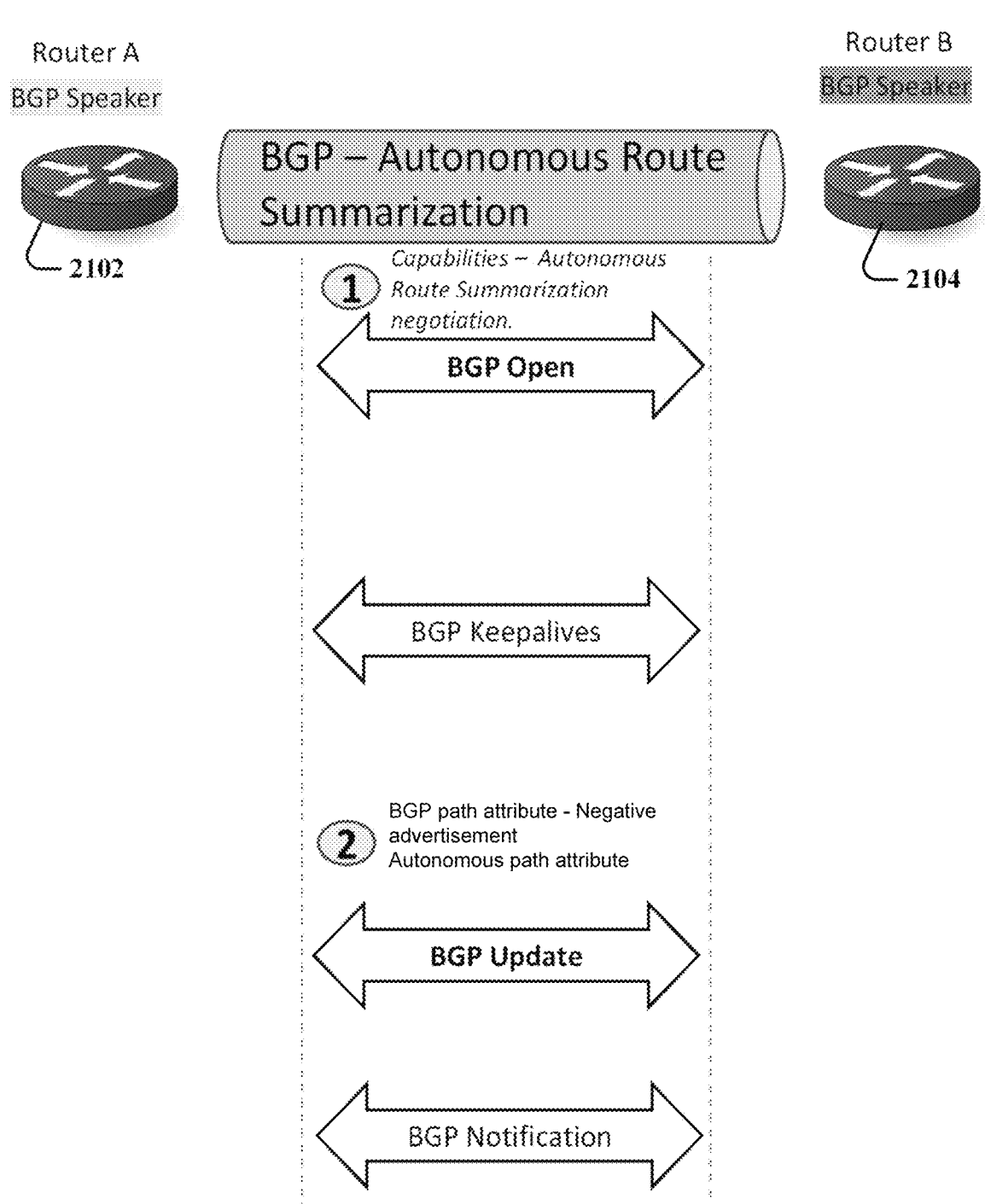
FIG. 2B is a block diagram illustrating an example, non-limiting embodiment of BGP (Border Gateway Protocol) autonomous route summarization in accordance with various aspects described herein.

Referring now to FIG. 2B, this is a block diagram illustrating an example, non-limiting embodiment of BGP autonomous route-summarization in accordance with various aspects described herein. As seen, the BGP autonomous route-summarization can be carried out between Router A (call-out number 2102) and Router B (call-out number 2104). Router 2102 can be a BGP speaker and Router 2104 can be a BGP speaker. In operation, the process can proceed from autonomous route-summarization BGP capabilities advertisement (BGP Open), to BGP Keepalives, to new BGP Path Attribute (BGP Update and BGP Notification).

Still referring to FIG. 2B, the autonomous route-summarization BGP capabilities advertisement (see number (1) in the figure) can include capabilities negotiation. Further, this autonomous route-summarization BGP capabilities advertisement can be carried out in the context of: (a) AFI (Address Family Identifiers) IPv4/IPv6; and/or SAFI (Subsequent Address Family Identifiers) Unicast/Labelled Unicast.

Still referring to FIG. 2B, after the BGP Open, the process can include one or more BGP Keepalives. Moreover, after the BGP Keepalives, the process can include (see number (2) in the figure) exchange of a BGP Path Attribute-Negative advertisement-Autonomous path attribute that carries summarization behavior and threshold for summary. The summarization behavior can include: (a) Sparse; (b) Random; (c) Dense with holes; and (d) Dense. The threshold for summary can define the behavior. The term "hole" as used herein can refer to a missing subnet and/or non-existent subnet in a given level.

Figure 2C:
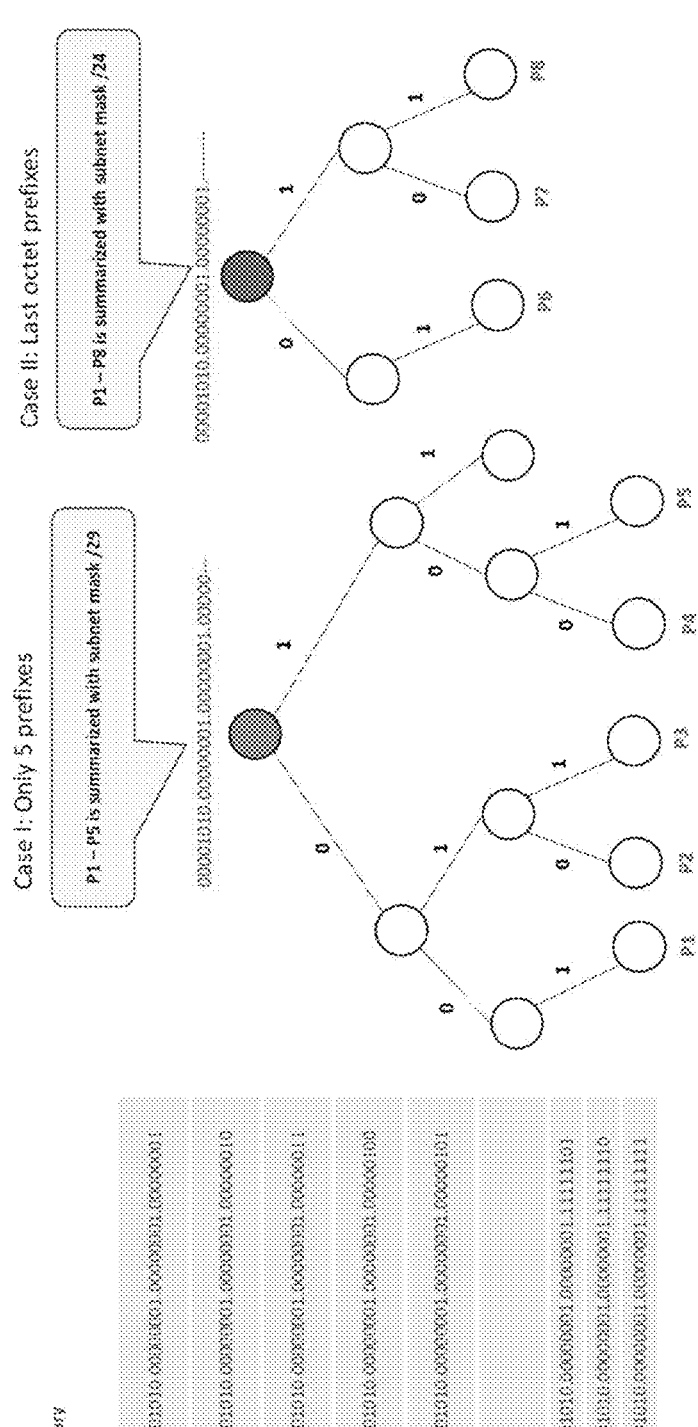
FIG. 2C is a block diagram illustrating an example, non-limiting embodiment of autonomous route summarization in accordance with various aspects described herein.

Referring now to FIG. 2C, this is a block diagram 2200 illustrating an example, non-limiting embodiment of autonomous route summarization in accordance with various aspects described herein. The diagram shows an internal representation of IP addresses in a TRIE Data Structure. The diagram also illustrates how IP addresses would look in database storage once summarized. As seen in this figure, there are eight example prefixes (P1-P8) and two example cases—Case I: Only 5 prefixes (P1-P5 summarized with subnet mask/29); and Case II: Last octet prefixes (P1-P8 summarized with subnet mask/24).

Figure 2D:
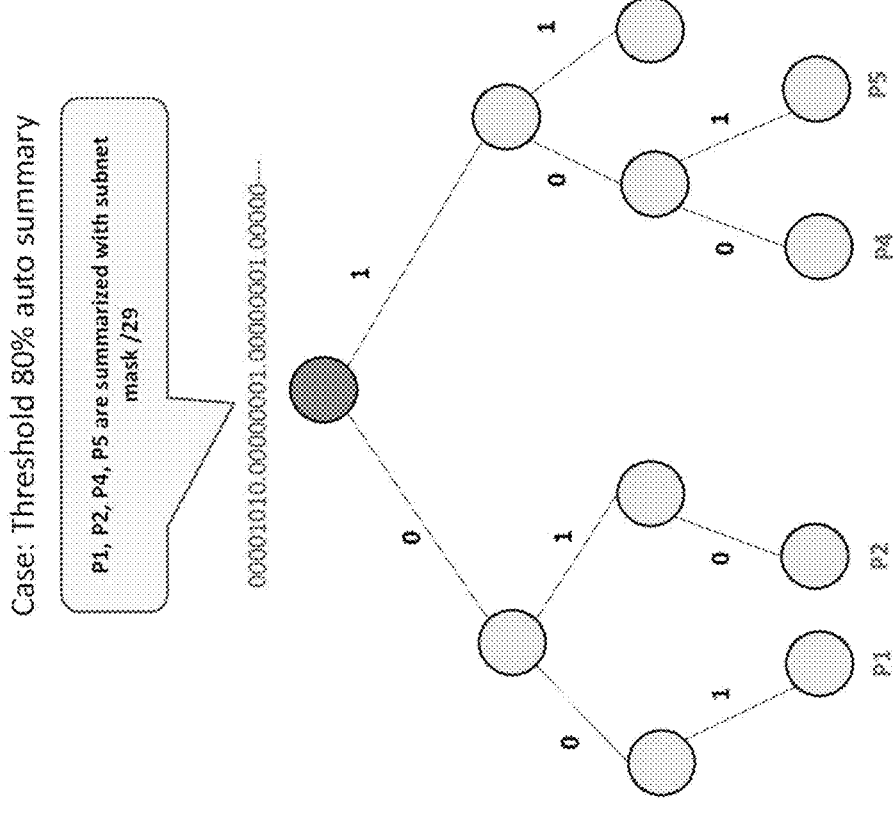
FIG. 2D is a block diagram illustrating an example, non-limiting embodiment of autonomous route summarization with thresholds in accordance with various aspects described herein.

Referring now to FIG. 2D, this is a block diagram 2300 illustrating an example, non-limiting embodiment of autonomous route summarization with thresholds in accordance with various aspects described herein. The diagram shows an internal representation of IP addresses in a TRIE Data Structure. The diagram also illustrates how IP addresses would look in database storage once summarized at 80% threshold. As seen in this figure, there are four example prefixes (P1, P2, P4, P5) and one example case—Threshold 80% auto summary (P1, P2, P4, P5 summarized with subnet mask/29).

Referring now to FIG. 2E, this is a block diagram 2400 illustrating an example, non-limiting embodiment of summarized route FIB install with exception NLRIs in accordance with various aspects described herein. This figure provides example details of five prefixes (P1, P2, P3, P4, P5). These example details will be used to describe a number of operating cases (the 80% threshold discussed below is of course provided as an example only, and any desired threshold percentage may be utilized).

Still referring to FIG. 2E, it is noted that there are three example cases as follows (see, also, the threshold auto summary of FIG. 2D):

Case (Summarization %>=Threshold 80%)
    If Summarization % reaches threshold %
       1. At 80% threshold; P1, P2, P4, P5 are auto summarized.
       2. P3 is explicitly notified as exception NLRI
Case (Summarization %<Threshold 80%)
    If Summarization falls below the threshold i.e. 80%;
       1. Auto summarization route is withdrawn,
       2. Any exception NLRIs are withdrawn,
       3. Available prefixes are advertised individually Case (P3 is Available):

P3 exception NLRI is withdrawn

Figure 2F:
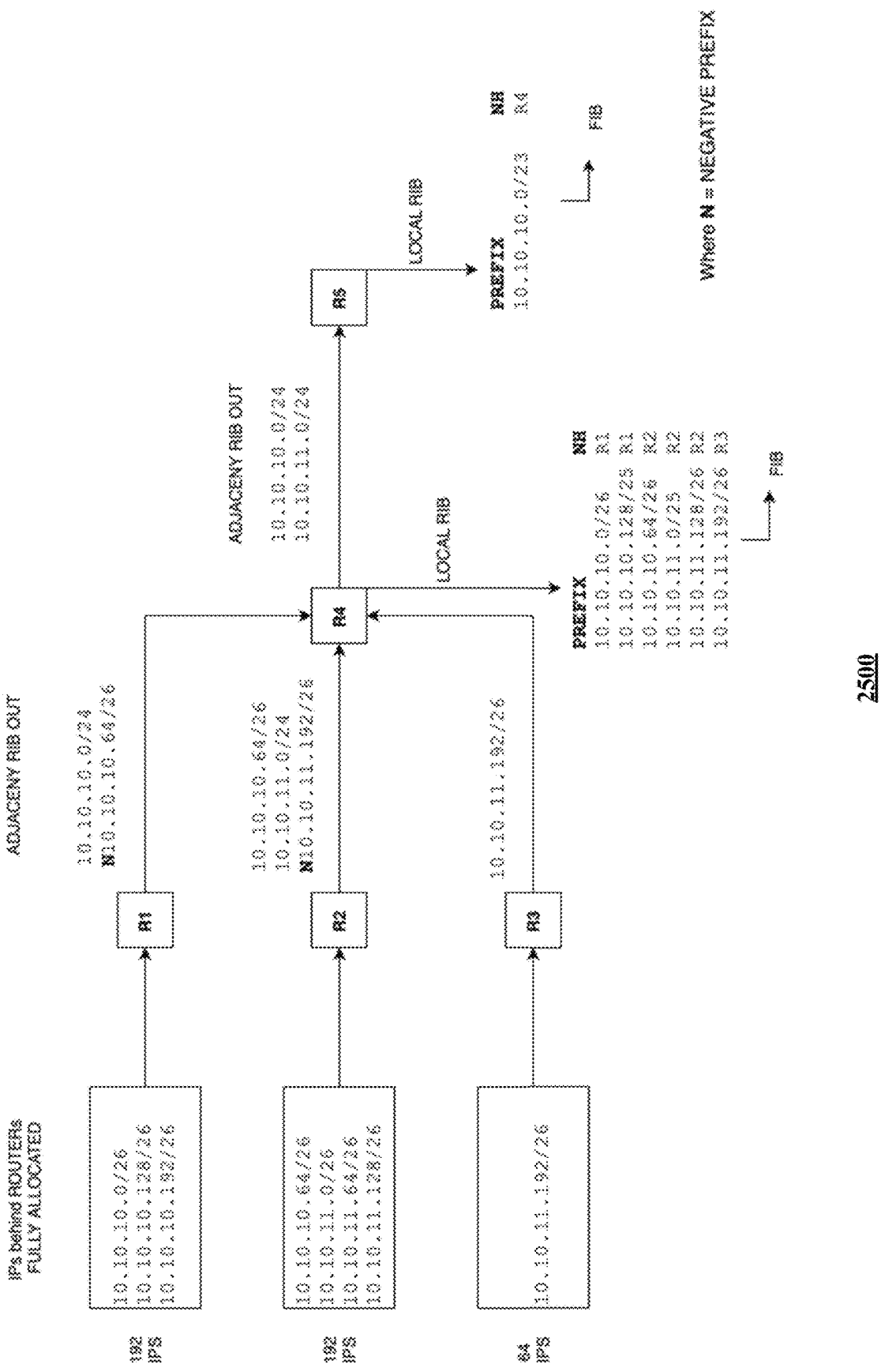
FIG. 2F is a block diagram illustrating an example adaptive summarization across a network topology in accordance with various aspects described herein.

Referring now to FIG. 2F, this is a block diagram 2500 illustrating an example adaptive summarization across a network topology in accordance with various aspects described herein. This example showcases a subnet range of 10.10.10.0/24 & 10.10.10.11/24 split across 3 edge routers. The aggregation, along with local RIB vs ADJ-RIB-OUT are also indicated in the figure. The reduction to ( . . . ) values, either in advertisements or the local RIB, indicate the savings both on BGP speaker's memory and compute, not to mention network flooding. This example is designed to showcase a split of 10.10.10.64/26 and 10.10.11.192/26 subnets as holes across the 3 routers. This distribution (in this example) limits the gain in reducing LOCAL-RIB size, however, does not impact the reduction in ADJ-RIB-OUT upstream from R4→R5. The hole from R1 (10.10.10.64/26) is advertised as a N-10.10.10.64/26 which signifies it as a negative prefix from R1→R4. Similarly, R2 advertises N-10.10.11.192/26 to R4. R4 on receiving such information installs 10.10.10.64/26 with NH (Next-Hop) R2 and not R1. Thus, LOCAL RIB which leads to BGP BPF (Best Path calculation) is accurate in updating the FIB. However, R4→R5 ADJ-OUT-RIB can still be collapsed to 10.10.10.0/25. This leads to only one entry on upstream R5 both in LOCAL-RIB and FIB, instead of 8.

Still referring to FIG. 2F, it is noted that scaling these numbers to 100 s/1000 s of prefixes based on the thresholding mechanism (according to various embodiments) can reduce network advertisements and LOCAL-RIB/FIB size to a great extent (on the other hand, various embodiments may have no (or little) impact for the random distribution of IP addresses).

Still referring to FIG. 2F, it is further noted that various embodiments can be agnostic to route changes as part of UPDATES/WITHDRAWS (as these routes can eventually lead to LOCAL-RIB and ADJ-RIB-OUT updates). In one example, the updates can be decided based on the RIB trie structuring as explained below.

Figure 2G:
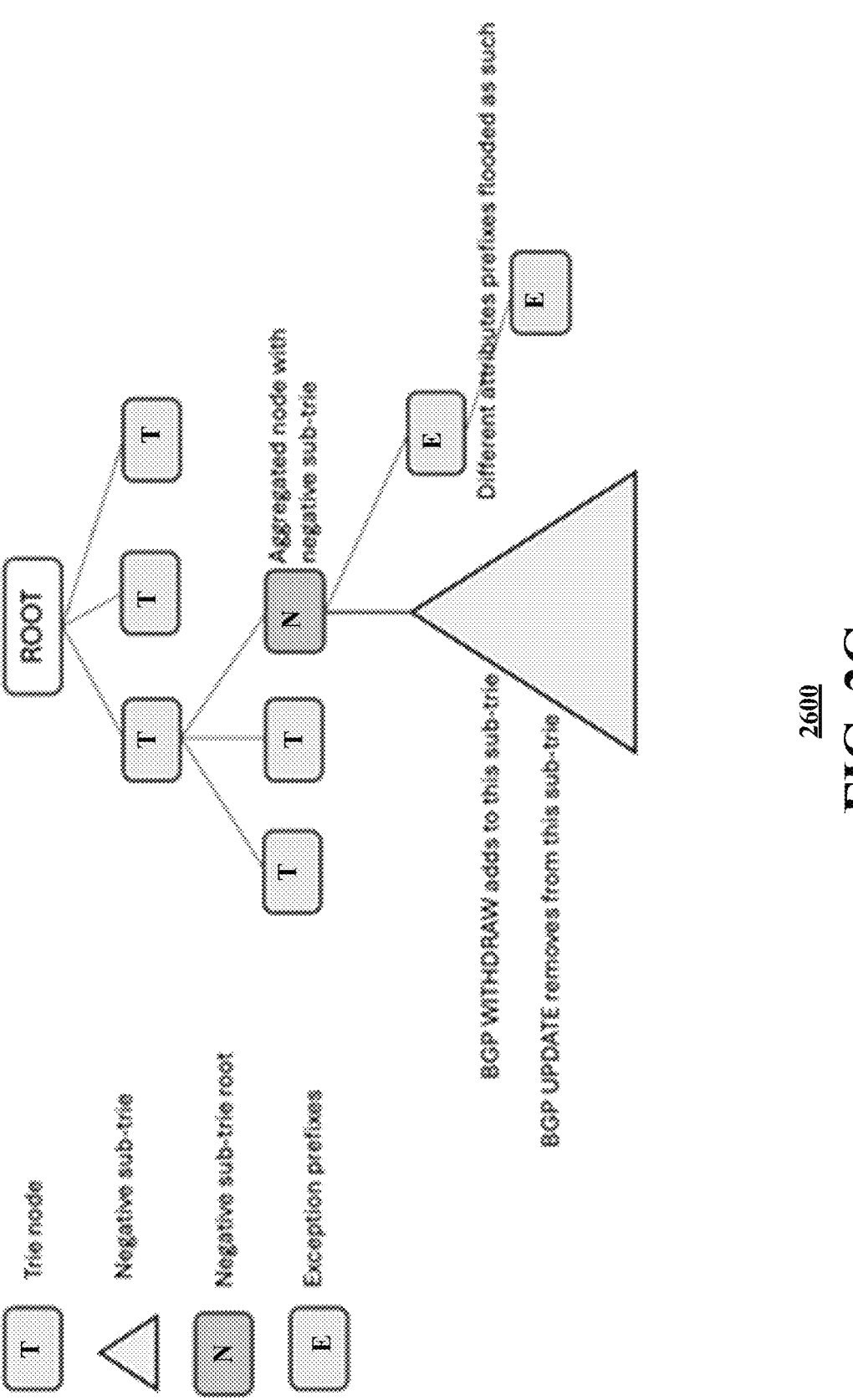
FIG. 2G is a block diagram illustrating an example LOCAL/ADJ-OUT-RIB Trie manipulation for negative prefixes in accordance with various aspects described herein.

Referring now to FIG. 2G, this is a block diagram 2600 illustrating an example LOCAL/ADJ-OUT-RIB Trie manipulation for negative prefixes in accordance with various aspects described herein. In this example, the incoming updates are used to update the LOCAL-RIB and eventually ADJ-RIB-OUT after BPF calculation. The internal trie structure is manipulated with special attribute nodes (different than a regular trie) to allow for ease of use in BPF and further creating outgoing updates in ADJ-RIB-OUT. Here, the aggregated node with negative sub-trie is a root of negative prefixes as well as escaped prefixes due to differing attributes (e.g., which could be differing NH for LOCAL-RIB only). The exception prefixes may be present in the ADJ-RIB-OUT due (for example) to attribute differences only. As seen in this FIG. 2G, the negative sub-trie also works for existing BGP UPDATES and WITHDRAWS.

Referring now to FIG. 3, this depicts an illustrative embodiment of a method 3000 in accordance with various aspects described herein. As seen in this figure, step 3002 comprises automatically determining for a plurality of downstream network nodes one or more subnet identifiers, one or more network identifiers, or a combination thereof. Next, step 3004 comprises automatically summarizing the one or more subnet identifiers, the one or more network identifiers, or the combination thereof to produce a summary. Next, step 3006 comprises automatically determining whether the summary requires updating, resulting in a determination. Next, step 3008 comprises responsive to the determination being that the summary requires updating, automatically updating the summary to produce an updated summary, wherein the updated summary: deletes one or more subnets that were in the summary; adds one or more subnets that were not in the summary; deletes one or more networks that were in the summary; adds one or more networks that were not in the summary; deletes one or more non-existent identifiers, other than the one or more subnet identifiers and the one or more network identifiers, that were in the summary; adds one or more non-existent identifiers, other than the one or more subnet identifiers and the one or more network identifiers, that were not in the summary; or any combination thereof. In various embodiments, each of the automatically determining the node identifiers/subnet(s), the automatically summarizing, the automatically determining whether the summary requires updating, and the automatically updating can be carried out using hardware, firmware, and/or software without human interaction required (after, for example, initiation of the process by a user).

In various embodiments, the automatically determining whether the summary requires updating comprises determining whether the summary is perfect, with no holes (negative/exception identifiers), or whether the summary is non-perfect with one or more holes (negative/exception identifiers based threshold).

In various embodiments, each of the one or more subnet identifiers and each of the one or more network identifiers comprises a respective IP4 address, a respective IP6 address, or any combination thereof.

In various embodiments, each of the one or more subnet identifiers and each of the one or more network identifiers comprises a respective address prefix.

In various embodiments, the operations further comprise advertising one or more negative identifiers.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide for autonomous route summarization (e.g., dynamic and adaptive autonomous route summarization). In this regard, a radix tree can be considered to be composed of many radix sub-trees with leaves. In one embodiment, a parse of the radix tree can yield density/sparsity measure of each node making a sub-tree. Additionally, a thresholding mechanism (according to an embodiment) can further be applied to this density or sparsity measure which can lead to collapsing the sub-tree for a leaf-node with negative/exceptional routes as leaf-nodes. Moreover, the thresholds can be based (according to an embodiment) on a command line interface (CLI) configuration.

As described herein, various embodiments can provide for adaptive prefix summarization for memory optimization and reduced control plane flooding in routing protocols implementation.

As described herein, various embodiments can be used in the context of any desired type of IP Routing.

As described herein, various embodiments can provide one or more of the following advantages: (a) Can support IPv6 where the (RIB/FIB) scale increase may otherwise become unmanageable by certain hardware; (b) Can be deployed along with BGP without any changes in control networking packets; (c) Can save bandwidth of the links for the needy traffic; and/or (d) Can operate such that no administrator intervention is required to summarize the routes.

As described herein, various embodiments can improve memory and CPU requirements and/or can improve the scalability number for given hardware.

As described herein, various embodiments can provide a router that would advertise the summarized prefix(es) automatically and withdraw the summarized prefix(es) as the network situation changes.

As described herein, various embodiments can provide for local memory optimization. Such local memory optimization can be realized, for example, by appropriately using the relevant data structures (e.g., patricia trie/radix trie).

As described herein, various embodiments can provide for network optimization by identifying and advertising summarized routes. Such network optimization can be realized, for example, by identifying the potential routes that can be summarized and replacing these individual routes with summarized prefixes in various scenarios while advertising to the neighbors/routers. This has the potential to, for example, exponentially reduce the number of IP routes advertised in the network. In various examples, there can be perfect/imperfect summarizations based on the criteria provided (such as via CLI (command line interface) configuration).

As described herein, various embodiments can provide for implementation in the context of BGP. Such implementation in the context of BGP can comprise changing a BGP Open message and adding a field to make this (autonomous summarization) behavior part of capability exchange. This can facilitate the advertising router dynamically/adaptively summarizing the prefixes. In various embodiments, BGP summarization can apply to a unique node in the network, a subnet, or a combination thereof.

As described herein, various embodiments can provide for network management (e.g., analytics). Such network management can be implemented, for example, in management software where all the routes could be collected and analyzed to identify how much performance/memory improvements could be brought in.

As described herein, various embodiments can provide analytics for monitoring network optimization as follows: The algorithm for adaptive route-summarization can be a network management software functionality which scans the node level and the whole network level and publishes the scope for network optimization by hinting—how much network resources could be saved. In one specific example, the network management software functionality can indicate that "65% of routes could be optimized by using adaptive route-summarization". In another specific example, the network optimizing statistics could be on the router and/or in a network management system.

As described herein, various embodiments can provide one or more of the following benefits: (a) Memory optimization in the network (e.g., all the routers save fewer routes)—both RIB and FIB; (b) Reduces CPU/Processing required for advertising the routes in the router and the whole network; (c) Helps conserve hardware (e.g., fewer hardware entries in the data plane to store routes for forwarding).

As described herein, various embodiments can provide for autonomously/adaptively reconfiguring upon detection of one or more holes and/or migration of one or more prefixes.

As described herein, various embodiments can provide for determining probable gain by aggregation (e.g., via calculation of the sparseness of the current RIB local based on level compression). If the gain exceeds some pre-determined criterion, then the aggregation can be auto-enabled.

As described herein, various embodiments can provide a BGP OPEN message exchange amongst peers that includes summarization capability exchange. For backward compatibility (and/or interop with routers that are incapable of summarization,) a RIB can also be used in a conventional manner. Thus (in various embodiments), all routers need not be capable of summarization, and optimization can nevertheless be achieved on routers that are capable of summarization. In one example, on the local RIB, the routes are stored as per summarization, however, it's expanded when sending out updates to a non-capable peer. In another example, in the case of thresholding, the local RIB again stores summarized routes with negative prefixes (smaller in number). In another example, the summarization provides more gains if enabled upstream (in progression from L2 RR to L3 RR (Route Reflectors) and even towards e-BGP sessions). In another example, the advertised routes reduce as more and more routes become capable (but, as mentioned, it does not mean that all routers need to be summarization capable before seeing the gain facilitated by aggregation).

As described herein, various embodiments can provide autonomous summarization to reduce routing advertisements (e.g., which can reduce memory, optimize routes processing, and/or improve scalability).

As described herein, various embodiments can provide unique adaptive restructuring of RIB (Out RIB) to facilitate the autonomous summarization. In this regard, it is noted that certain RIB has conventionally been structured as a radix tree, where all the prefixes form the leaves. However, due to autonomous summarization (according to various embodiments), a set of leaves or a set of sub-trees collapse into a set of leaf nodes with or without exceptions.

As described herein, various embodiments can provide BGP capability exchange (e.g., to facilitate routes summarization). In this regard, it is noted that certain BGP capability exchange has conventionally been used by routers to exchange their routing capabilities with peer nodes. However, for autonomous route summarization (according to various embodiments), such a capability exchange is extended in the BGP OPEN message to facilitate autonomous summarization within the router. According to various embodiments, this can delineate the autonomous route summarized network/node from the rest of the network (e.g., since, for example, summarized routes will not be received from/sent to non-capable routers)

As described herein, various embodiments can provide for extending the BGP NLRI Aggregate attribute usage. In this regard, it is noted that NLRI refers to certain conventional Network Layer Reachability Information (in short, the set of IP prefixes which a specific node advertises as reachable from). A user can also conventionally configure an aggregation of prefixes to be advertised as a group. However, this typically requires the user to plan and configure such information and is typically static. According to various embodiments, such a configuration can be extended with thresholds applied to certain groups as described herein. In addition, these summarizations can (according to various embodiments) be limited to certain aggregation groups only (e.g., based on prefixes, communities, peers/peer-groups, and/or other prefix-attributes). Further, different thresholds (according to various embodiments) can be applied for different aggregate groups. This can, for example, limit the application of autonomous summarization (if desired) to a subset of the RIB.

As described herein, various embodiments can provide for extending a BGP "Negative Route" Path attribute to facilitate autonomous summarization. In this regard, it is noted that certain existing BGP Negative routes refer to a set of one or more prefixes which should not be reached via the advertised node. Since, as described herein, autonomous summarization (according to various embodiments) could be imperfect (e.g., with holes), thresholding can be provided and/or negative routes can be used to fill those holes. This can facilitate a mechanism (according to various embodiments) to summarize a sub-tree with holes filled in with negative routes. In addition, negative-routes (according to various embodiments) can be extended to prefix-attributes (and not just NLRI information).

As described herein, various embodiments can provide an algorithm to identify one or more summarization candidates. Further, various embodiments can provide thresholding (e.g., via CLI) to enable perfect/imperfect summarization (e.g., using classification of dense/sparse summarization categories). More particularly, according to various embodiments a summarization algorithm (with thresholding) can operate as follows (in this context, it is noted that a radix tree can be considered to be composed of many radix sub-trees with leaves): A parse of the radix tree can yield density/sparsity measure of each node making a sub-tree. Additionally, a thresholding mechanism can further be applied to this density and sparsity measure which leads to either collapsing the sub-tree for a leaf-node with/without exceptional routes and an exceptional leaf-node with/without advertised routes respectively. The thresholds can be based (for example) on CLI configuration, and whether to apply it to RIB or exceptional routes tree. Such a configuration can enable perfect/imperfect summarization.

As described herein, certain manual BGP summarization has conventionally been deployed based on fixed user configuration. However, various embodiments described herein improve upon such manual summarization (e.g., to reduce BGP routes advertisement) via use of an autonomous/dynamic mechanism (which, in one example, implements constant monitoring of the networks advertised).

As described herein, certain level compression algorithms have conventionally been used to reduce the size of memory footprint of RIB (local/out). However, various embodiments described herein improve upon such level compression algorithms by operating in the context of BGP advertisement.

As described herein, various embodiments can provide an algorithm that learns and adapts (e.g. goes back and forth between summarization and no summarization).

As described herein, various embodiments can provide an algorithm with a default behavior (e.g., always summarize).

As described herein, various embodiments can provide an algorithm that can autonomously deal with a case such as a fiber cut in the network (see, e.g., P3 in FIG. 2E).

As described herein, various embodiments can provide an algorithm which decides to summarize or not summarize based upon certain time periods (e.g., time since a last update).

As described herein, various embodiments can provide an algorithm which operates in a cloud base router.

Figure 4:
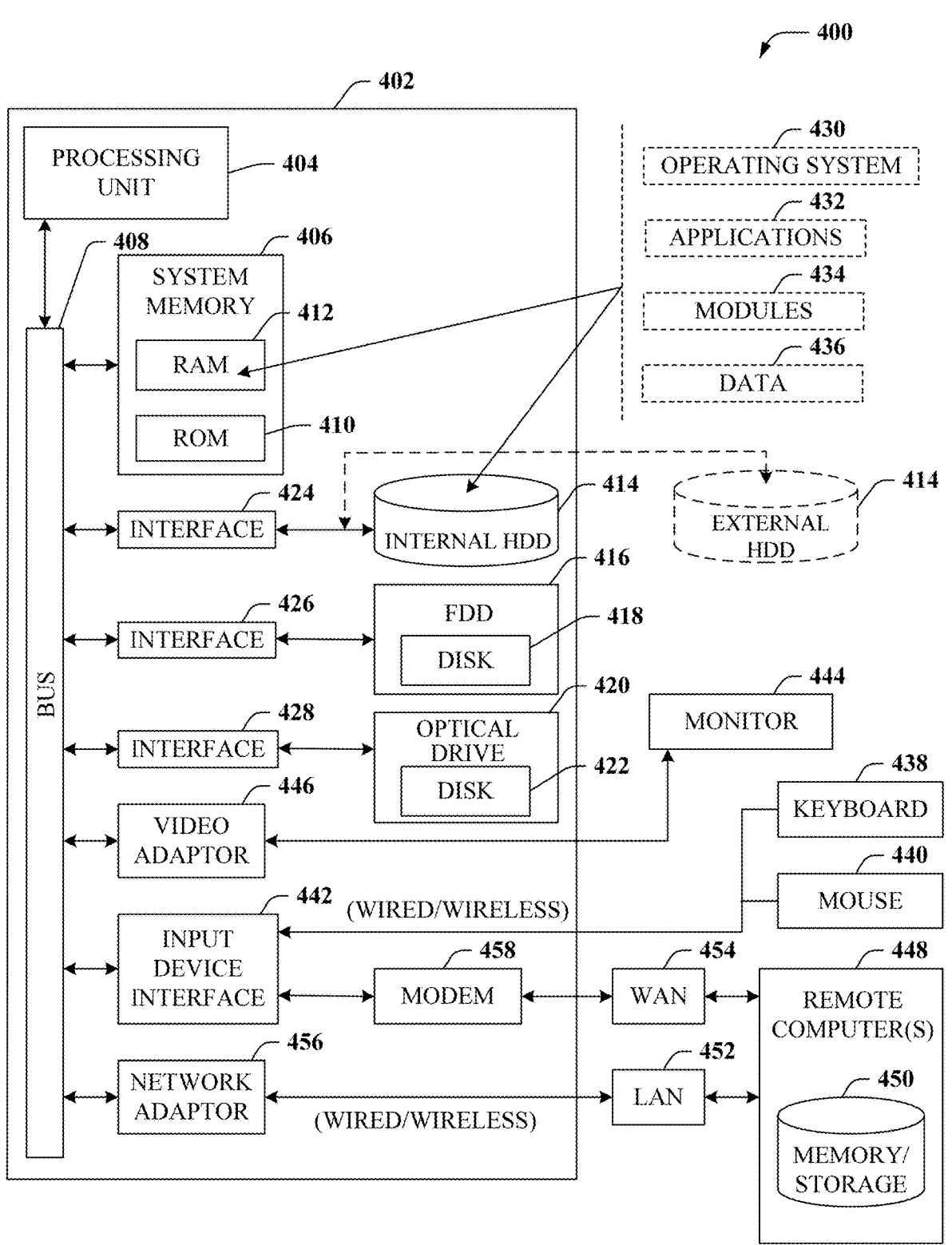
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate in whole or in part autonomous adaptive route-summarization.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue"

indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An apparatus, comprising:

a processing system including a processor; and a memory that stores executable instructions that, when executed by the processing system, facilitate performance of operations, the operations comprising:

automatically determining for a plurality of downstream network nodes one or more subnet identifiers, one or more network identifiers, or a combination thereof;

automatically summarizing the one or more subnet identifiers, the one or more network identifiers, or the combination thereof to produce a summary, wherein a quantity of the one or more subnet identifiers, the one or more network identifiers, or the combination thereof is less than a total number of possible identifiers in a particular radix trie sub-trie, and wherein the automatically summarizing is triggered responsive to a determination that the quantity is at least a particular threshold percentage of the total number of possible identifiers;

automatically determining whether the summary requires updating, resulting in another determination; and responsive to the other determination being that the summary requires updating, automatically updating the summary to produce an updated summary, wherein the updated summary: deletes one or more subnets that were in the summary; adds one or more subnets that were not in the summary; deletes one or more networks that were in the summary; adds one or more networks that were not in the summary; deletes one or more non-existent identifiers, other than the one or more subnet identifiers and the one or more network identifiers, that were in the summary; adds one or more non-existent identifiers, other than the one or more subnet identifiers and the one or more network identifiers, that were not in the summary; or any combination thereof.

2. The apparatus of claim 1, wherein:

the apparatus comprises a router; and the automatically determining whether the summary requires updating one or more of (i) comprises determining whether the summary is perfect, with no holes, or whether the summary is non-perfect with one or more holes, and (ii) is based upon a threshold.

3. The apparatus of claim 2, wherein the automatically determining whether the summary requires updating further comprises:

determining a first number of downstream network nodes that are reachable by the router;

determining a second number of downstream network nodes that are not reachable by the router; and calculating, based upon the first number and the second number, a percentage of downstream network nodes that are reachable by the router relative to a total number of network nodes, resulting in a calculated percentage.

4. The apparatus of claim 3, wherein:

the threshold is configured by a user; and the calculated percentage meeting the threshold results in the other determination being that the summary requires updating.

5. The apparatus of claim 4, wherein the meeting the threshold comprises being equal to or greater than the threshold.

6. The apparatus of claim 4, wherein the meeting the threshold comprises being equal to or less than the threshold.

7. The apparatus of claim 1, wherein the apparatus comprises a router, and wherein the operations further comprise automatically sending by the router to another router a Border Gateway Protocol (BGP) message comprising information indicative of one or more parameters that were used in the updating of the summary.

8. The apparatus of claim 7, wherein the one or more parameters that were used in the updating of the summary comprise a threshold level of downstream network nodes that are reachable by the router.

9. The apparatus of claim 1, wherein the automatically determining whether the summary requires updating comprises:

determining that at least one of the plurality of downstream network nodes is no longer reachable by the apparatus;

determining that at least one additional downstream network node, that was not part of the plurality of downstream network nodes, is now reachable by the apparatus;

determining that at least one of the one or more subnets is no longer reachable by the apparatus;

determining that at least one additional subnet, that was not part of the one or more subnets, is now reachable by the apparatus;

determining that at least one of the one or more networks is no longer reachable by the apparatus;

determining that at least one additional network, that was not part of the one or more networks is now reachable by the apparatus; or any combination thereof.

10. The apparatus of claim 1, wherein:

the apparatus comprises a router; and the plurality of downstream network nodes comprises a plurality of downstream endpoint devices that are reachable by the router.

11. The apparatus of claim 1, wherein:

the apparatus comprises a router; and the plurality of downstream network nodes comprises one or more other routers that are reachable by the router.

12. The apparatus of claim 1, wherein each of the one or more subnet identifiers and each of the one or more network identifiers comprises a respective IP4 address, a respective IP6 address, or any combination thereof.

13. The apparatus of claim 12, wherein each of the one or more subnet identifiers and each of the one or more network identifiers comprises a respective address prefix.

14. The apparatus of claim 1, wherein the operations further comprise:

advertising the summary to one or more upstream network nodes; and advertising the updated summary to the one or more upstream network nodes.

15. The apparatus of claim 14, wherein the one or more upstream network nodes comprise one or more respective routers.

16. The apparatus of claim 1, wherein the operations further comprise advertising one or more negative identifiers.

17. A non-transitory machine-readable medium comprising executable instructions that, when executed by a processing system including a processor, facilitate performance of operations, the operations comprising:

automatically determining for a plurality of downstream network nodes one or more subnet identifiers, one or more network identifiers, or a combination thereof;

automatically summarizing the one or more subnet identifiers, the one or more network identifiers, or the combination thereof to produce a summary, wherein a quantity of the one or more subnet identifiers, the one or more network identifiers, or the combination thereof is less than a total number of possible identifiers in a particular radix trie sub-trie, and wherein the automatically summarizing is triggered responsive to a determination that the quantity is at least a particular threshold percentage of the total number of possible identifiers;

automatically determining whether the summary requires updating, resulting in another determination; and responsive to the other determination being that the summary requires updating, automatically updating the summary to produce an updated summary, wherein the updated summary: deletes one or more subnets that were in the summary; adds one or more subnets that were not in the summary; deletes one or more networks that were in the summary; adds one or more networks that were not in the summary; deletes one or more non-existent identifiers, other than the one or more subnet identifiers and the one or more network identifiers, that were in the summary; adds one or more non-existent identifiers, other than the one or more subnet identifiers and the one or more network identifiers, that were not in the summary; or any combination thereof.

18. The non-transitory machine-readable medium of claim 17, wherein:

the processing system comprises a router; and the operations further comprise automatically sending by the router to another router a Border Gateway Protocol (BGP) message comprising information indicative of one or more parameters that were used in the updating of the summary.

19. A method, comprising:

automatically determining, by a processing system including a processor, for a plurality of downstream network nodes one or more subnet identifiers, one or more network identifiers, or a combination thereof;

automatically summarizing, by the processing system, the one or more subnet identifiers, the one or more network identifiers, or the combination thereof to produce a summary, wherein a quantity of the one or more subnet identifiers, the one or more network identifiers, or the combination thereof is less than a total number of possible identifiers in a particular radix trie sub-trie, and wherein the automatically summarizing is triggered responsive to a determination that the quantity is at least a particular threshold percentage of the total number of possible identifiers;

automatically determining, by the processing system, whether the summary requires updating, resulting in another determination; and responsive to the other determination being that the summary requires updating, automatically updating, by the processing system, the summary to produce an updated summary, wherein the updated summary: deletes one or more subnets that were in the summary; adds one or more subnets that were not in the summary; deletes one or more networks that were in the summary; adds one or more networks that were not in the summary; deletes one or more non-existent identifiers, other than the one or more subnet identifiers and the one or more network identifiers, that were in the summary; adds one or more non-existent identifiers, other than the one or more subnet identifiers and the one or more network identifiers, that were not in the summary; or any combination thereof.

20. The method of claim 19, wherein the automatically determining whether the summary requires updating comprises:

determining, by the processing system, that at least one of the plurality of downstream network nodes is no longer reachable by the processing system;

determining, by the processing system, that at least one additional downstream network node, that was not part of the plurality of downstream network nodes, is now reachable by the processing system;

determining, by the processing system, that at least one of the one or more subnets is no longer reachable by the processing system;

determining, by the processing system, that at least one additional subnet, that was not part of the one or more subnets, is now reachable by the processing system;

determining, by the processing system, that at least one of the one or more networks is no longer reachable by the processing system;

determining, by the processing system, that at least one additional network, that was not part of the one or more networks, is now reachable by the processing system; or any combination thereof.

* * * * *